United States Patent
Jeon et al.

(10) Patent No.: US 11,952,443 B2
(45) Date of Patent: *Apr. 9, 2024

(54) COMPOSITION FOR PREPARING VINYL CHLORIDE-BASED POLYMER AND METHOD OF PREPARING VINYL CHLORIDE-BASED POLYMER USING THE SAME

(71) Applicant: LG CHEM, LTD., Seoul (KR)

(72) Inventors: Yang Jun Jeon, Daejeon (KR); Hyun Min Lee, Daejeon (KR); Hyun Kyou Ha, Daejeon (KR); Kun Ji Kim, Daejeon (KR); Kwang Jin Lee, Daejeon (KR); Jin Hyuck Ju, Daejeon (KR); Jae Hyun Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 596 days.

This patent is subject to a terminal disclaimer.

(21) Appl. No.: 17/265,133

(22) PCT Filed: Oct. 30, 2019

(86) PCT No.: PCT/KR2019/014499
§ 371 (c)(1),
(2) Date: Feb. 1, 2021

(87) PCT Pub. No.: WO2020/091429
PCT Pub. Date: May 7, 2020

(65) Prior Publication Data
US 2021/0309769 A1 Oct. 7, 2021

(30) Foreign Application Priority Data
Nov. 2, 2018 (KR) .................. 10-2018-0133740

(51) Int. Cl.
- *C08F 14/06* (2006.01)
- *C08K 3/26* (2006.01)
- *C08L 27/06* (2006.01)

(52) U.S. Cl.
CPC ............... *C08F 14/06* (2013.01); *C08K 3/26* (2013.01); *C08K 2201/019* (2013.01)

(58) Field of Classification Search
CPC ........ C08F 14/06; C08K 3/26; C08J 2327/06; C08L 27/06
See application file for complete search history.

(56) References Cited

U.S. PATENT DOCUMENTS

| | | |
|---|---|---|
| 5,151,476 A | 9/1992 | Marshall et al. |
| 6,242,541 B1 | 6/2001 | Hohenadel et al. |
| 6,355,743 B1 * | 3/2002 | Ooura ............ C08F 2/004 526/233 |
| 2004/0024104 A1 | 2/2004 | Ota et al. |
| 2007/0100044 A1 | 5/2007 | Jeon et al. |
| 2008/0039601 A1 | 2/2008 | Percee et al. |
| 2011/0077342 A1 | 3/2011 | Hidalgo et al. |
| 2014/0088222 A1 | 3/2014 | Jeda et al. |
| 2018/0185410 A1 | 7/2018 | Holmgren et al. |
| 2019/0055331 A1 | 2/2019 | Lee et al. |
| 2020/0255626 A1 | 8/2020 | Ahn et al. |

FOREIGN PATENT DOCUMENTS

| | | |
|---|---|---|
| CN | 100368444 C | 2/2008 |
| CN | 101161693 A | 4/2008 |
| CN | 101787166 A | 7/2010 |
| CN | 103183759 A | 7/2013 |
| CN | 103351445 A | 10/2013 |
| CN | 105440219 A | 3/2016 |
| EP | 0306433 A2 | 3/1989 |
| EP | 0523930 A2 | 1/1993 |
| EP | 0556053 A1 | 8/1993 |
| JP | S64-070503 A | 3/1989 |
| JP | H02-208307 A | 8/1990 |
| JP | H03-244603 A | 10/1991 |
| JP | H05-271313 A | 10/1993 |
| JP | H06-279510 A | 10/1994 |
| JP | 2007-510790 A | 4/2007 |
| KR | 10-1984-0000709 B | 5/1984 |
| KR | 2007-0023055 A | 2/2007 |
| KR | 10-2016-0058567 A | 5/2016 |
| KR | 10-2016-0061127 A | 5/2016 |
| KR | 10-1721295 B | 4/2017 |
| KR | 10-2018-0047361 A | 5/2018 |
| NO | 2012-165021 A1 | 12/2012 |
| WO | 2002-005949 A1 | 1/2002 |
| WO | 2006-080928 A1 | 8/2006 |
| WO | 2013092730 A1 | 6/2013 |
| WO | 2018-056610 A1 | 3/2018 |
| WO | 2018-070804 A1 | 4/2018 |
| WO | 2018-104777 A1 | 6/2018 |

\* cited by examiner

*Primary Examiner* — Catherine S Branch
(74) *Attorney, Agent, or Firm* — Bryan Cave Leighton Paisner LLP

(57) ABSTRACT

The present disclosure relates to a composition for preparing a vinyl chloride-based polymer and a method of preparing a vinyl chloride-based polymer using the same, and provides the composition giving excellent productivity for preparing a vinyl chloride-based polymer includes while maintaining excellent foaming and viscosity properties of a plastisol including the prepared vinyl chloride-based polymer, by including a pH regulator composed of a carbonate-based metal salt, and a transition metal catalyst in the composition, and controlling an amount of the transition metal catalyst, and controlling an amount of a reducing agent such that a trace amount or none of the reducing agent is included, and the method of preparing a vinyl chloride-based polymer using the same.

11 Claims, No Drawings

COMPOSITION FOR PREPARING VINYL CHLORIDE-BASED POLYMER AND METHOD OF PREPARING VINYL CHLORIDE-BASED POLYMER USING THE SAME

TECHNICAL FIELD

Cross-Reference to Related Applications

This application is a National Stage Application of International Application No. PCT/KR2019/014499, filed Oct. 30, 2019 and claims the benefit of Korean Patent Application No. 10-2018-0133740, filed on Nov. 2, 2018, in the Korean Intellectual Property Office, the disclosure of which is incorporated herein in its entirety by reference.

TECHNICAL FIELD

The present disclosure relates to a composition for preparing a vinyl chloride-based polymer, which may improve foaming and viscosity properties of the prepared polymer and productivity, and a method of preparing a vinyl chloride-based polymer using the same.

BACKGROUND ART

A vinyl chloride-based polymer is a polymer containing 50 wt % or more of a repeating unit derived from a vinyl chloride monomer (VCM), wherein it has various applications because it is inexpensive, its hardness is easily controlled, and it is applicable to most processing apparatuses. In addition, since the vinyl chloride-based polymer may provide a molded article having excellent physical and chemical properties such as mechanical strength, weather resistance, and chemical resistance, the vinyl chloride-based polymer is being widely used in many fields.

A vinyl chloride-based resin is a general-purpose resin most widely used in the world as life and industrial materials, wherein, typically, a straight vinyl chloride-based resin, as powder particles having a size of about 100 μm to 200 μm, has been prepared by a suspension polymerization method, and a paste vinyl chloride-based resin, as powder particles having a size of about 0.1 μm to 2 μm, has been prepared by an emulsion polymerization method.

With respect to the paste vinyl chloride-based resin, a latex obtained by emulsion polymerization is typically dried by a spray drying method to form final resin particles, and the particles are dispersed in a solvent or a plasticizer and used in products, such as a flooring material, wallpaper, a tarpaulin, a raincoat, gloves, an automotive underbody coating, and carpet tiles, through a process such as coating (reverse roll-coating, knife coating, screen coating, spray coating), gravure and screen printing, rotation casting, and shell casting and dipping.

As described above, since the paste vinyl chloride-based resin is a general-purpose plastic widely used in various fields, studies to increase productivity of the paste vinyl chloride-based resin have been conducted. For example, an oxidation-reduction polymerization (redox polymerization) method has been suggested as one of methods capable of increasing the productivity in the preparation of the paste vinyl chloride-based resin. The redox polymerization may improve the productivity by effectively reducing reaction time by using a medium that oxidizes and/or reduces metal ions and metal, and, in a case in which the redox polymerization is particularly used in an emulsion polymerization method in which heat generation is concentrated at the end of reaction, a more uniform heat distribution may be obtained by activating initial reaction.

However, in conventional redox polymerization, an amount of metal ions formed form a transition metal catalyst must be sufficiently large in order to sufficiently improve reactivity, and it is necessary to add an oxidizing agent and/or reducing agent to regenerate the metal ions, but, in a case in which a predetermined amount or more of the oxidizing agent and/or reducing agent is added, foaming and viscosity properties of a vinyl chloride-based resin prepared may be deteriorated.

Thus, there is a need for a composition for preparing a vinyl chloride-based polymer and a polymerization method which may simultaneously improve the reactivity while the foaming and viscosity properties of the vinyl chloride-based resin prepared are maintained at excellent levels.

PRIOR ART DOCUMENT

Patent Document (Patent Document 1) Korean Patent Application Laid-open Publication No. 10-2016-0058567

DISCLOSURE OF THE INVENTION

Technical Problem

The present disclosure aims at providing a composition for preparing a vinyl chloride-based polymer, and a method of preparing a vinyl chloride-based polymer using the same. Since the composition for preparing a vinyl chloride-based polymer includes a transition metal catalyst and a pH regulator, and uses a carbonate-based metal salt as the pH regulator, an amount of the transition metal catalyst may be reduced, polymerization productivity may be improved by including none or a trace amount of a reducing agent which has been essentially included in the past, and foaming and viscosity properties of a plastisol including the prepared vinyl chloride-based polymer may be improved to excellent levels.

Technical Solution

According to an aspect of the present disclosure, there is provided a composition for preparing a vinyl chloride-based polymer which includes a vinyl chloride-based monomer, a transition metal catalyst, a pH regulator composed of a carbonate-based metal salt, and 0 ppm to 150 ppm of a reducing agent based on a weight of the vinyl chloride-based monomer, wherein the transition metal catalyst is included in an amount of 0.01 ppm to 3.0 ppm based on the weight of the vinyl chloride-based monomer.

According to another aspect of the present disclosure, there is provided a method of preparing a vinyl chloride-based polymer which includes the steps of: adding 0.01 ppm to 3.0 ppm of a transition metal catalyst based on a weight of a vinyl chloride-based monomer, a pH regulator composed of a carbonate-based metal salt, and 0 ppm to 150 ppm of a reducing agent based on the weight of the vinyl chloride-based monomer to a polymerization reactor (step 1); and performing polymerization by adding the vinyl chloride-based monomer to the polymerization reactor (step 2).

Advantageous Effects

In the present disclosure, since a carbonate-based metal salt is used as a pH regulator in an oxidation-reduction polymerization (redox polymerization) system for preparing a vinyl chloride-based polymer, an amount of a transition metal catalyst included in a composition for preparing a polymer may be significantly reduced and a reducing agent, which must be included in a conventional redox polymerization system, may not be included or a trace amount of the reducing agent may be included, and thus, productivity may be improved by improving polymerization reactivity while ensuring excellent levels of foaming and viscosity properties of a plastisol including the prepared vinyl chloride-based polymer.

MODE FOR CARRYING OUT THE INVENTION

Hereinafter, the present disclosure will be described in more detail to allow for a clearer understanding of the present disclosure.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the disclosure, based on the principle that an inventor may properly define the meaning of the words or terms to best explain the disclosure.

Definition of Terms

The term "polymer" used in the present specification denotes a polymeric compound prepared by polymerizing monomers, whether they are the same or different species. As such, the generic term "polymer" refers to a polymer prepared from only one type of monomer, wherein it encompasses the term homopolymer commonly used and the term interpolymer as defined below.

The expression "vinyl chloride-based polymer" used in the present specification inclusively represents a compound formed by polymerizing a vinyl chloride-based monomer, wherein it may mean a polymer chain derived from the vinyl chloride-based monomer.

The term "plastisol" used in the present specification denotes a mixture, in which a resin and a plasticizer are mixed so that the mixture may be molded, casted, or processed in the form of a continuous film by heating, and, for example, may denote a paste form in which the vinyl chloride-based polymer and the plasticizer are mixed.

The term "composition" used in the present specification includes a mixture of materials including the corresponding composition as well as reaction and decomposition products formed from a material of the corresponding composition.

In the present specification, an average particle diameter ($D_{50}$) may be defined as a particle diameter corresponding to 50% of the cumulative number of particles in a particle diameter distribution curve of the particles. The average particle diameter ($D_{50}$), for example, may be measured by using a laser diffraction method. The laser diffraction method may generally measure a particle diameter ranging from a submicron level to a few mm, and may obtain highly repeatable and high resolution results.

1. Composition for Preparing Vinyl Chloride-Based Polymer

An embodiment of the present disclosure provides a composition for preparing a vinyl chloride-based polymer which includes a vinyl chloride-based monomer, a transition metal catalyst, a pH regulator composed of a carbonate-based metal salt, and 0 ppm to 150 ppm of a reducing agent based on a weight of the vinyl chloride-based monomer, wherein the transition metal catalyst is included in an amount of 0.01 ppm to 3.0 ppm based on the weight of the vinyl chloride-based monomer.

In general, a composition for preparing a polymer includes a vinyl chloride-based monomer, a transition metal catalyst, a pH regulator, and an oxidizing agent and/or reducing agent in an oxidation-reduction polymerization (redox polymerization) system which may be used in the preparation of a vinyl chloride-based polymer. In this case, since a strong basic material, such as sodium hydroxide, which is mainly used as a pH regulator, has a very high pH and has no carbonate ions, the formation of a vinyl chloride-based polymer for plastisol processing may be difficult due to an agglomeration phenomenon when an excessive amount of the strong basic material is added for optimum pH adjustment, there is a risk of over-foaming when foam formulation is performed through the plastisol processing, and a large amount of volatile organic compound may be generated. Also, in a case in which a small amount of the strong basic material is added to stabilize a polymer latex prepared and maintain viscosity and foaming properties, it may not help to improve reactivity so that productivity may be reduced. Furthermore, in a case in which a material without carbonate ions is used as the pH regulator, since the material may not oxidize and/or reduce metal ions formed from transition metal, an oxidizing agent and/or reducing agent must be essentially included to maintain the redox polymerization system.

In this case, the oxidizing agent and/or reducing agent mainly used in a vinyl chloride-based polymerization process may be a weak acid substance, and, if an excessive amount of the weak acid substance is added to sufficiently oxidize or reduce the metal ions, since pH is reduced during polymerization, the polymerization is performed under acidic conditions, and thus, a decomposition reaction of the initiator having higher reactivity under low pH conditions may be excessive to cause a problem of polymerization reaction runaway and a problem of increase in the amount of the volatile organic compound of the prepared polymer. In a case in which a polymer is prepared under acidic conditions, a problem of significant deterioration in heat resistance of the polymer itself may occur as defect sites in the prepared polymer increase.

Furthermore, in a case in which an acidic substance, such as potassium phosphate, is used as a pH regulator, since the pH in the polymerization reaction is further reduced, the polymerization may also be performed under acidic conditions, the same problems occurred when the oxidizing agent and/or reducing agent were added as described above may occur.

Thus, it is desirable to use the carbonate-based metal salt as the pH regulator in order to achieve all effects of the improvement in viscosity and foaming properties of the prepared polymer and plastisol and the increase in polymerization productivity.

Since the carbonate-based metal salt pH regulator contains carbonate ions, an acidic reducing agent, which is essentially included in a conventional composition for preparing a vinyl chloride-based polymer, may not be included or a trace amount thereof may be included and the amount of the transition metal catalyst may be significantly reduced as a reducing reaction with metal ions of the transition metal catalyst is smooth, and, accordingly, it may prevent the deterioration of physical properties, for example, an increase in viscosity and degradation of foam color, which may occur by including a large amount of the transition metal catalyst.

Also, since $CO_3^-$ radicals of the carbonate ions generated by a reduction reaction of the metal ions may decompose the polymerization initiator to further enhance activity of the polymerization initiator and to be able to play a role in donating electrons to structural defects of the vinyl chloride-based polymer prepared, there is an effect of improving the structural defects of the polymer, and thus, the reactivity as well as the viscosity and foaming properties of the plastisol may be simultaneously improved.

The composition for preparing a vinyl chloride-based polymer according to the embodiment of the present disclosure may not include a reducing agent or may include 150 ppm or less of the reducing agent based on the weight of the vinyl chloride-based monomer, and may preferably not include the reducing agent. In a case in which an amount of the reducing agent included is greater than 150 ppm in the present disclosure, since both the carbonate-based metal salt, as the pH regulator, and the excessive amount of the reducing agent contribute to the reduction reaction, it is difficult to control a polymerization process due to rapid increases in reaction temperature and reaction pressure caused by high polymerization reactivity, and, accordingly, a problem may occur in which a polymer with required physical properties may not be obtained, and a problem may occur in which foam color of the plastisol may be degraded as a reducing agent component remains in the prepared polymer.

Also, the composition for preparing a vinyl chloride-based polymer according to the embodiment of the present disclosure may sufficiently improve the reactivity by using the carbonate-based metal salt even if an oxidizing agent, as an auxiliary raw material improving the reactivity, is not included, and, in a case in which the oxidizing agent is included, since the same problems described in the reducing agent may occur, it is desirable not to include the oxidizing agent capable of oxidizing the metal ions as well as the reducing agent in order to stabilize the polymerization reaction and prevent the degradation of the viscosity and foam properties of the plastisol.

The transition metal catalyst according to an embodiment of the present disclosure may be included in an amount of 0.01 ppm to 3.0 ppm, preferably 0.01 ppm to 1.2 ppm, and more preferably 0.01 ppm to 0.5 ppm based on the weight of the vinyl chloride-based monomer. The transition metal catalyst is a material capable of improving reactivity by promoting the activity of the initiator, wherein the reactivity may be improved even with a relatively small amount of the initiator when the amount of the transition metal catalyst is large, but, in a case in which the transition metal catalyst is excessively included in an amount of greater than 3.0 ppm, since the control of the reactivity at an initial stage of the polymerization is difficult, the number of polymer particles initially formed may be significantly increased, and, as a result, viscosities of the prepared polymer and plastisol may be significantly increased and foam colors of the polymer and plastisol may be degraded due to a transition metal catalyst component remaining in the polymer.

Furthermore, since the pH regulator composed of the carbonate-based metal salt is used in the present disclosure, the present disclosure has an effect in which the reactivity may be improved to an excellent level even if a small amount of the transition metal catalyst is used.

According to an embodiment of the present disclosure, the carbonate-based metal salt is not particularly limited as long as it contains carbonate ions ($C_3^{2-}$), but, in terms of improving reactivity, the carbonate-based metal salt may preferably include at least one selected from the group consisting of sodium carbonate ($Na_2CO_3$), sodium hydrogen carbonate ($NaHCO_3$), magnesium carbonate ($MgCO_3$), calcium carbonate ($CaCO_3$), and potassium carbonate ($K_2CO_3$), and may more preferably include sodium carbonate, sodium hydrogen carbonate, potassium carbonate, or a mixture thereof.

According to an embodiment of the present disclosure, the carbonate-based metal salt may be included in an amount of 50 ppm to 1,200 ppm, preferably 100 ppm to 1,000 ppm, and more preferably 150 ppm to 1,000 ppm based on a total weight of the vinyl chloride-based monomer. In a case in which the amount of the carbonate-based metal salt is included within the above range, since optimum pH may be obtained during the polymerization and the reduction reaction with the transition metal catalyst may be made at an appropriate level, the viscosity properties and foam colors of the prepared polymer and plastisol may be improved to excellent levels along with the effect that polymerization productivity is improved.

The transition metal catalyst according to the embodiment of the present disclosure is not limited as long as it is a transition metal compound used in the preparation of the vinyl chloride-based polymer, and the transition metal catalyst may specifically include copper sulfate, iron sulfate, or a mixture thereof. The copper sulfate may include copper(I) sulfate ($Cu_2SO_4$), copper(II) sulfate ($CuSO_4$), or a mixture thereof, and the iron sulfate may include iron(II) sulfate ($FeSO_4$), iron(III) sulfate ($Fe_2(SO_4)_3$), or a mixture thereof.

The vinyl chloride-based polymer prepared by using the composition for preparing a vinyl chloride-based polymer according to the embodiment of the present disclosure may not only be a polymer purely composed of a vinyl chloride-based monomer, but may also be a copolymer of a vinyl chloride-based monomer, as a main component, and a vinyl-based monomer copolymerizable with the vinyl chloride-based monomer. In a case in which the vinyl chloride-based polymer is the copolymer of the vinyl chloride monomer and the vinyl-based monomer, vinyl chloride may be included in an amount of 50% or more in the copolymer.

Accordingly, the vinyl chloride-based monomer usable according to the embodiment of the present disclosure may be a vinyl chloride single material; or may be a mixture of vinyl chloride and a vinyl-based monomer copolymerizable with the vinyl chloride. The vinyl-based monomer is not particularly limited, but may include an olefin compound such as ethylene, propylene, and butane, vinyl esters such as vinyl acetate, vinyl propionate, and vinyl stearate, unsaturated nitriles such as acrylonitrile, vinyl alkyl ethers such as vinyl methyl ether, vinyl ethyl ether, vinyl octyl ether, and vinyl lauryl ether, halogenated vinylidenes such as vinylidene chloride, an unsaturated fatty acid such as acrylic acid, methacrylic acid, itaconic acid, maleic acid, fumaric acid, maleic anhydride, and itaconic anhydride, and anhydrides of these fatty acids, unsaturated fatty acid esters such as methyl acrylate, ethyl acrylate, monomethyl maleate, dimethyl maleate, and butyl benzyl maleate, and a crosslinkable monomer such as diallyl phthalate, and any one thereof or a mixture of two or more thereof may be used.

2. Method of Preparing Vinyl Chloride-Based Polymer

The present disclosure provides a method of preparing a vinyl chloride-based polymer which includes a step of polymerizing a vinyl chloride-based monomer by using the above-described composition for preparing a vinyl chloride-based polymer.

Specifically, the method of preparing a vinyl chloride-based polymer according to an embodiment of the present disclosure may include the steps of: adding 0.01 ppm to 3.0 ppm of a transition metal catalyst based on a weight of a vinyl chloride-based monomer, a pH regulator composed of a carbonate-based metal salt, and 0 ppm to 150 ppm of a reducing agent based on the weight of the vinyl chloride-based monomer to a polymerization reactor (step 1); and performing polymerization by adding the vinyl chloride-based monomer to the polymerization reactor (step 2).

Also, according to an embodiment of the present disclosure, the present disclosure may further include a step of performing a vacuum treatment of the polymerization reactor before the step 2).

In this case, the polymerization reactor may be a polymerization reactor filled with one or more emulsifiers and a polymerization initiator, and, herein, the expression "filled polymerization reactor" denotes a state in which additives, such as the polymerization initiator and the one or more emulsifiers have been introduced into the polymerization reactor before the vinyl chloride-based monomer is added, that is, it denotes that the polymerization reactor is a polymerization reactor including the one or more emulsifiers and the polymerization initiator.

Furthermore, according to an embodiment of the present disclosure, an auxiliary raw material, such as a solvent (polymerization water) and a chain transfer agent, may be further added in addition to the one or more emulsifiers and the polymerization initiator, and types of materials added as the auxiliary raw material, polymerization temperature, types of the polymerization initiator, or types of the emulsifier may be appropriately selected according to types of emulsion polymerization described below.

The method of preparing a vinyl chloride-based polymer according to the present disclosure may be performed by a polymerization method which may be commonly used in the art, and the polymerization may specifically be performed by pure emulsion polymerization, seed emulsion polymerization, or microsuspension polymerization.

Hereinafter, the seed emulsion polymerization, the microsuspension polymerization, and the pure emulsion polymerization will be described separately.

Seed Emulsion Polymerization

In a case in which the polymerization is seed emulsion polymerization, the polymerizing may include the steps of: preparing a vinyl chloride-based polymerization seed (step i); and adding the above-described composition for preparing a vinyl chloride-based polymer to the polymerization seed and performing polymerization (step ii).

That is, according to the present disclosure, the seed emulsion polymerization is characterized in that a carbonate-based metal salt is included in the composition for preparing a polymer of the polymerization of the step ii.

Step i

The step i is a step of preparing a vinyl chloride-based polymerization seed in order to increase a bonding force of the vinyl chloride-based monomer, provide a bimodal effect to the finally prepared vinyl chloride-based polymer, or achieve a larger particle of the polymer having a unimodal molecular weight distribution than the pure emulsion polymerization.

The polymerization seed is not particularly limited, but may include one type of seed (first seed or second seed) according to the purpose, and may be a seed mixture in which the first seed and second seed having different average particle diameters are mixed, and, in a case in which the seed mixture is prepared, the seed mixture may be a mixture, in which the first seed and the second seed are mixed in an appropriate weight ratio, for example, a mixture in which the first seed and the second seed are mixed in a weight ratio of 1:1 to 3:1.

Hereinafter, the first seed will be described in detail.

The first seed may be prepared by adding 100 parts by weight of the vinyl chloride-based monomer and 0.1 part by weight to 15 parts by weight of a first emulsifier to a reactor filled with a polymerization initiator, performing homogenization, and then performing emulsion polymerization at a temperature of 30° C. to 70° C.

The reactor filled with the polymerization initiator may represent a reactor in which a mixed solution including the polymerization initiator is contained, and the mixed solution may further include polymerization water, a separate emulsifier, a reaction inhibitor, and a dispersant in addition to the polymerization initiator, but the present disclosure is not limited thereto.

It is desirable that the polymerization initiator is used in an amount of 0.01 part by weight to 2 parts by weight based on 100 parts by weight of the vinyl chloride-based monomer, and an average particle diameter of the finally formed first seed may be adjusted according to the amount of the polymerization initiator used. For example, the average particle diameter of the finally formed first seed may be reduced as the amount of the polymerization initiator used is increased.

The first seed particles may have an average particle diameter (D50) of 0.5 μm to 1.0 μm.

The polymerization initiator is not particularly limited, but at least one of a water-soluble initiator and an oil-soluble initiator may be used, and, for example, the polymerization initiator may include at least one oil-soluble polymerization initiator selected from the group consisting of peroxy carbonates, peroxyesters, and azo-based compounds. Specifically, the oil-soluble polymerization initiator may include at least one selected from the group consisting of lauryl peroxide (LPO), di-2-ethylhexyl peroxydicarbonate (OPP), diisopropyl peroxydicarbonate, t-butyl peroxypivalate, t-butyl peroxyneodecanoate, and 2,2-azobisisobutyronitrile, and, for example, may include lauryl peroxide (LPO), di-2-ethylhexyl peroxydicarbonate (OPP), or a mixture thereof.

The first emulsifier may include at least one selected from the group consisting of sodium lauryl sulfate, lauryl benzene sulfonic acid, alpha-olefin sulfonate, sodium dodecyl benzene sulfonate, sodium lauryl ethoxylated sulfate, sodium octadecyl sulfate, sodium lauryl ether sulfate, and linear alkylbenzene sulfonate. Also, the separate emulsifier may be the same as the first emulsifier or may be included in the first emulsifier.

The reaction inhibitor is not particularly limited, but, for example, paraquinone, hydroquinone, butylated hydroxytoluene, monomethyl ether hydroquinone, quaternary butyl catechol, diphenylamine, triisopropanolamine, and triethanolamine may be used.

Also, the dispersant is not particularly limited, but, for example, higher alcohols, such as lauryl alcohol, myristic alcohol, and stearyl alcohol, or higher fatty acids, such as lauric acid, myristic acid, palmitic acid, and stearic acid, may be used.

The homogenization is not particularly limited, but may be performed by homogenizing for 1 hour to 3 hours using a homogenizer at a temperature of 20° C. or less, particularly at a temperature of 5° C. to 15° C. In this case, the homogenizer is not particularly limited, but a conventional homogenizer known in the art may be used, for example, a rotor-stator type homogenizer may be used, and a total pressure of the homogenizer during a homogenization process may be in a range of 1,000 psi to 2,000 psi. Also, the homogenization may be performed by distributing the polymerization mixture to a front end and a rear end of the homogenizer, if necessary.

The emulsion polymerization for the preparation of the first seed may be performed at a temperature of 30° C. to 70° C. as described above, and, specifically, the emulsion polymerization may be initiated by increasing the temperature by 40° C. to 50° C. from the homogenization temperature and may be performed by performing polymerization for 5 hours to 15 hours.

Furthermore, as described above, the polymerization seed may include the second seed which has an average particle diameter different from that of the first seed, and the seed mixture, in which the first seed and the second seed are appropriately mixed, may be used if necessary.

Hereinafter, the second seed will be described in detail.

The second seed according to an embodiment of the present disclosure may be prepared by the steps of: adding 100 parts by weight of the vinyl chloride-based monomer to the reactor filled with the first emulsifier and initiating polymerization at a temperature of 30° C. to 70° C.; and continuously adding a second emulsifier during the polymerization and performing emulsion polymerization for 4 hours to 10 hours.

The reactor filled with the first emulsifier represents a reactor in which an emulsion including the first emulsifier is contained, and the emulsion may include polymerization water and a polymerization initiator in addition to the first emulsifier.

The first emulsifier may be used in an amount of 0.01 part by weight to 1 part by weight based on 100 parts by weight of the vinyl chloride-based monomer, and an average particle diameter of the finally formed second seed may be adjusted according to the amount of the first emulsifier used. For example, the average particle diameter of the finally formed second seed may be increased as the amount of the first emulsifier used is increased.

The second seed particles may have an average particle diameter (D50) of 0.05 μm to 0.5 μm.

The polymerization initiator may be a water-soluble polymerization initiator, and may specifically include at least one selected from the group consisting of potassium persulfate, ammonium persulfate, and hydrogen peroxide.

The second emulsifier is continuously added into the reactor during the emulsion polymerization, and may be used in an amount of 0.01 part by weight to 6 parts by weight based on 100 parts by weight of the vinyl chloride-based monomer.

Specific types of the first emulsifier are the same as those described above, the second emulsifier may be the same as the above-described first emulsifier or may be included in the first emulsifier, and the first emulsifier and second emulsifier used in the present disclosure may mean different types of materials or may just mean the order of the addition. Thus, the first emulsifier and the second emulsifier may be the same material or may be different materials from each other.

Step ii

The step ii is a step of performing polymerization by adding the above-described composition for preparing a vinyl chloride-based polymer according to the embodiment of the present disclosure, which includes the carbonate-based metal salt, to the vinyl chloride-based polymerization seed prepared in the step i in order to obtain a vinyl chloride-based polymer.

The polymerization of the step ii is not limited, but may be performed by adding a transition metal catalyst, a pH regulator composed of the carbonate-based metal salt, a reducing agent, and the vinyl chloride-based monomer to the polymerization reactor, in which the first seed, the second seed, or the seed mixture, and polymerization water are mixed, and performing a reaction. Also, the first emulsifier may be continuously added before the addition of the composition for preparing a vinyl chloride-based polymer and/or during the polymerization, and, in the polymerization, the reaction may be performed by further adding additives such as a polymerization initiator, a chain transfer agent, and an electrolyte.

Furthermore, a vacuum treatment of the polymerization reactor may be performed before the addition of the vinyl chloride-based monomer in the polymerization.

Since the composition for preparing a vinyl chloride-based polymer according to the embodiment of the present disclosure is used in the seed emulsion polymerization, the same effects as those described above, for example, the productivity improvement and the improvements in viscosity properties and foam color of the polymer and plastisol, may be achieved, and details regarding the input amounts and types of the carbonate-based metal salt, transition metal catalyst, and reducing agent are the same as those described above.

Specifically, the transition metal catalyst, the pH regulator composed of the carbonate-based metal salt, and selectively the reducing agent are added to the polymerization reactor including 70 parts by weight to 200 parts by weight of the polymerization water and 0.1 part by weight to 20 parts by weight of the first seed, the second seed, or the seed mixture including the first seed and the second seed based on 100 parts by weight of the vinyl chloride-based monomer, 100 parts by weight of the vinyl chloride-based monomer are added after the polymerization reactor is subjected to a vacuum treatment, and the polymerization may be initiated in a temperature range of 30° C. to 70° C. In this case, amounts of the transition metal catalyst, the pH regulator composed of the carbonate-based metal salt, and the reducing agent are the same as those in the above-described composition for preparing a vinyl chloride-based polymer. Also, 0.2 part by weight to 2.5 parts by weight of the first emulsifier based on 100 parts by weight of the vinyl chloride-based monomer may be continuously added during the reaction or before the vacuum treatment of the reactor, and the reaction may be performed by further adding additives, for example, 0.1 part by weight to 1.5 parts by weight of the polymerization initiator, 0.5 part by weight to 2.0 parts by weight of the electrolyte, and 0.1 part by weight to 1.0 part by weight of the chain transfer agent based on 100 parts by weight of the vinyl chloride-based monomer, if necessary. Furthermore, a dispersant may be included in the polymerization, but the present disclosure is not limited thereto, and, preferably, the dispersant may not be included.

The polymerization initiator is divided into an oil-soluble polymerization initiator and a water-soluble polymerization initiator, and an appropriate polymerization initiator may be used depending on the application and need. The water-soluble polymerization initiator may include at least one selected from the group consisting of potassium persulfate, ammonium persulfate, and hydrogen peroxide, the oil-soluble polymerization initiator may include at least one selected from the group consisting of peroxy carbonates, peroxyesters, and azo-based compounds, and specific examples thereof are the same as those described above.

The chain transfer agent is not particularly limited, but, for example, may include n-butyl mercaptan, n-octyl mercaptan, n-dodecyl mercaptan, and t-dodecyl mercaptan.

The electrolyte is not particularly limited, but, for example, may include at least one selected from the group consisting of potassium chloride, sodium chloride, potassium bicarbonate, sodium carbonate, potassium carbonate, potassium hydrogen sulfite, sodium hydrogen sulfite, potassium pyrophosphate, tetra sodium pyrophosphate, tripotassium phosphate, trisodium phosphate, dipotassium hydrogen phosphate, and disodium hydrogen phosphate.

Also, the polymerization may include a homogenization process, the homogenization may be performed by the above-described method, and, in addition, additives, such as a reaction inhibitor, may be the same as those described above.

Microsuspension Polymerization

In a case in which the polymerization is microsuspension polymerization, the polymerizing may include a step of polymerizing a vinyl chloride-based monomer by adding the composition for preparing a vinyl chloride-based polymer according to the embodiment of the present disclosure to a polymerization reactor filled with one or more emulsifiers, one or more auxiliary emulsifiers, and polymerization water.

Specifically, the polymerizing may be a step of performing microsuspension polymerization at a temperature of 30° C. to 70° C., after a transition metal catalyst, a pH regulator composed of a carbonate-based metal salt, a reducing agent, and the vinyl chloride-based monomer are added to the polymerization reactor filled with the one or more emulsifier, the one or more auxiliary emulsifiers, and the polymerization water.

Also, the polymerization reactor may be subjected to a vacuum treatment before the addition of the vinyl chloride-based monomer in the polymerization.

Furthermore, time of the addition of a polymerization initiator in the polymerization is not limited, but, for example, the polymerization initiator may be added before the addition of the vinyl chloride-based monomer, for example, before the vacuum treatment of the polymerization reactor is performed, or the polymerization initiator may be added together while adding the vinyl chloride-based monomer.

Similarly, since the above-described composition for preparing a vinyl chloride-based polymer is also used in the microsuspension polymerization, the same effects as those described above, for example, the productivity improvement and the improvements in viscosity properties and foam color of the polymer and plastisol, may be achieved, and details regarding the input amounts and types of the carbonate-based metal salt, transition metal catalyst, and reducing agent are the same as those described above.

The polymerization reactor filled with the one or more emulsifier, the one or more auxiliary emulsifiers, and the polymerization water represents a polymerization reactor in which a mixed solution including the one or more emulsifier, the one or more auxiliary emulsifiers, and the polymerization water is contained, and the mixed solution may further include additives, for example, a reaction inhibitor, 0.5 part by weight to 2.0 parts by weight of an electrolyte, and 0.1 part by weight to 2.0 parts by weight of a chain transfer agent, in addition to the emulsifier, the auxiliary emulsifier, and the polymerization water, if necessary, but the present disclosure is not limited thereto. The additives may be the same as those described above. A dispersant may be included in the microsuspension polymerization, but the present disclosure is not limited thereto, and specific types of the dispersant may be the same as those described above.

The emulsifier in the microsuspension polymerization may be added in an amount of 0.1 part by weight to 5 parts by weight, for example, 0.1 part by weight to 2.0 parts by weight based on 100 parts by weight of the vinyl chloride-based monomer, and types of the emulsifier may be the same as those of the above-described first emulsifier or may be included in the first emulsifier.

The auxiliary emulsifier may be added in an amount of 0.1 part by weight to 6.0 parts by weight, for example, 0.1 part by weight to 3.0 parts by weight based on 100 parts by weight of the vinyl chloride-based monomer, and the auxiliary emulsifier may include an alcohol-based compound having 12 to 20 carbon atoms.

The polymerization initiator may be an oil-soluble polymerization initiator and may be added in an amount of 0.01 part by weight to 2 parts by weight based on 100 parts by weight of the vinyl chloride-based monomer, and specific types of the oil-soluble polymerization initiator may be the same as those described above.

Also, since a particle size in the microsuspension polymerization may be adjusted by a homogenization process, it is desirable to include the homogenization process, and, specifically, the homogenization process may be performed in the same manner as described above.

Pure Emulsion Polymerization

In a case in which the polymerization is emulsion polymerization, the polymerizing may include a step of polymerizing a vinyl chloride-based monomer by adding the composition for preparing a vinyl chloride-based polymer according to the embodiment of the present disclosure to a polymerization reactor filled with one or more first emulsifiers and a polymerization initiator.

Specifically, the polymerizing may include a step of performing polymerization by adding a transition metal catalyst, a pH regulator composed of a carbonate-based metal salt, a reducing agent, and the vinyl chloride-based monomer to the polymerization reactor containing the one or more first emulsifiers and the polymerization initiator, and, in this case, the polymerization is performed by performing a polymerization reaction at a temperature of 30° C. to 70° C. Also, a second emulsifier may be additionally added separately from the first emulsifier during the polymerization, and the second emulsifier may be continuously added during the polymerization.

Furthermore, a vacuum treatment of the polymerization reactor may be performed before the addition of the vinyl chloride-based monomer in the polymerization.

Since the above-described composition for preparing a vinyl chloride-based polymer is also used in the pure emulsion polymerization, the same effects as those described above, for example, the productivity improvement and the improvements in viscosity properties and foam color of the polymer and plastisol, may be achieved, and details regarding the input amounts and types of the carbonate-based metal salt, transition metal catalyst, and reducing agent are the same as those described above.

The reactor filled with the first emulsifier and the polymerization initiator represents a reactor in which a mixture including the first emulsifier and the polymerization initiator is contained, and the mixture may further include additives, such as polymerization water, a dispersant, a reaction inhibitor, a chain transfer agent, and an electrolyte, in addition to the first emulsifier and the polymerization initiator.

The first emulsifier may be used in an amount of 0.005 part by weight to 0.5 part by weight based on 100 parts by weight of the vinyl chloride-based monomer, and types of the first emulsifier are the same as those described above.

The polymerization initiator may be a water-soluble polymerization initiator and may be used in an amount of 0.01 part by weight to 2.0 parts by weight based on 100 parts by weight of the vinyl chloride-based monomer, and the water-soluble polymerization initiator may include at least one selected from the group consisting of potassium persulfate, ammonium persulfate, and hydrogen peroxide.

Also, the second emulsifier is continuously added into the reactor during the polymerization, and may be used in an amount of 0.01 part by weight to 6 parts by weight based on 100 parts by weight of the vinyl chloride-based monomer. The second emulsifier may be the same as the above-described first emulsifier or may be included in the first emulsifier, and the first emulsifier and second emulsifier used in the present disclosure may mean different types of materials or may just mean the order of the addition. Thus, the first emulsifier and the second emulsifier may be the same material or may be different materials from each other.

Furthermore, as described above, 70 parts by weight to 200 parts by weight of the polymerization water based on 100 parts by weight of the vinyl chloride-based monomer included in the composition for preparing a vinyl chloride-based polymer may be further included in the polymerization reactor, and, in addition, the reaction may be performed by further adding additives, for example, 0.5 part by weight to 2.0 parts by weight of the electrolyte, 0.1 part by weight to 2.0 part by weight of the chain transfer agent, and the reaction inhibitor based on 100 parts by weight of the vinyl chloride-based monomer included in the composition for preparing a vinyl chloride-based polymer, if necessary. Herein, specific types of the electrolyte, the chain transfer agent, and the reaction inhibitor are the same as those described above.

Also, in the preparation method according to the embodiment of the present disclosure, the polymerization may be performed at a pH of 7 to 12, for example, a pH of 9 to 10, and the pH may be obtained according to the use of the pH regulator including the carbonate-based metal salt. Thus, in a case in which the polymerization is performed under basic conditions, a stable polymerization reaction may be performed as described above.

The polymerization performed according to an embodiment of the present disclosure may be terminated when a pressure in the reactor is in a range of 3.0 kgf/cm$^2$ to 5.0 kgf/cm$^2$.

Also, according to the present disclosure, a step of drying the prepared vinyl chloride-based polymer may be further included, wherein the drying is not particularly limited in this case but may be performed by a method commonly known in the art, and the drying may specifically be performed according to a spray-drying method. A step of dehydration and washing may be further included before the drying.

3. Vinyl Chloride-Based Polymer and Plastisol

The present disclosure provides a vinyl chloride-based polymer prepared by the above preparation method and a plastisol including a plasticizer.

The vinyl chloride-based polymer according to the present disclosure is prepared by the above preparation method, wherein, since it is a vinyl chloride-based polymer with a considerably small amount of the volatile organic compound generated, a performance of the polymer may be equal to or better than that of a conventional vinyl chloride-based polymer.

The vinyl chloride-based polymer according to the present disclosure, for example, may be a paste vinyl chloride-based polymer.

The plastisol according to an embodiment of the present disclosure may further include 40 parts by weight to 180 parts by weight, 80 parts by weight to 160 parts by weight, or 100 parts by weight to 140 parts by weight of a plasticizer based on 100 parts by weight of the vinyl chloride-based polymer, and may further include an additive, such as a dispersion diluent, a heat stabilizer, a viscosity modifier, and a foaming agent, if necessary.

The expression "plasticizer" in the present disclosure may denote an organic additive material which plays a role in improving high-temperature moldability of a thermoplastic resin by being added to the resin to increase thermoplasticity.

Those commonly known in the art may be used as the plasticizer and the additive.

Since the plastisol according to the embodiment of the present disclosure has excellent viscosity characteristics by including the vinyl chloride-based polymer prepared by the above preparation method, the plastisol may have excellent processability as well as excellent other performance characteristics and foaming properties.

EXAMPLES

Hereinafter, the present disclosure will be described in more detail, according to specific examples. However, the following examples are merely presented to exemplify the present disclosure, and the scope of the present disclosure is not limited thereto.

Example 1

100 parts by weight of polymerization water, 0.07 part by weight of an initiator (potassium persulfate), 0.025 part by weight of an emulsifier (sodium lauryl sulfate), 800 ppm (based on weight of vinyl chloride monomer) of sodium carbonate, and 0.1 ppm (based on weight of vinyl chloride monomer) of copper sulfate ($CuSO_4$) were added to a reactor having an internal volume of 1 m$^3$ and equipped with a stirrer and the reactor was evacuated while stirring. 100 parts by weight of the vinyl chloride monomer was added to the reactor in a vacuum state and the temperature of the reactor was then increased to 50° C. to initiate polymerization. In this case, after the initiation of the polymerization, 1.0 part by weight of an emulsifier (sodium lauryl sulfate) was further continuously added. The reaction was terminated when a pressure of the reactor reached 3.5 kgf/cm 2, and a polymer latex prepared was recovered and then spray-dried to prepare a vinyl chloride polymer.

Example 2

A vinyl chloride polymer was prepared in the same manner as in Example 1 except that copper sulfate was added in an amount of 0.02 ppm based on the weight of the vinyl chloride monomer in Example 1.

Example 3

A vinyl chloride polymer was prepared in the same manner as in Example 1 except that sodium carbonate ($Na_2CO_3$) was added in an amount of 200 ppm based on the weight of the vinyl chloride monomer in Example 1.

Example 4

A vinyl chloride polymer was prepared in the same manner as in Example 1 except that sodium hydrogen carbonate (NaHCO$_3$) was added instead of the sodium carbonate in Example 1.

Example 5

A vinyl chloride polymer was prepared in the same manner as in Example 1 except that potassium carbonate (K$_2$CO$_3$) was added instead of the sodium carbonate in Example 1.

Example 6

A vinyl chloride polymer was prepared in the same manner as in Example 1 except that 100 ppm (based on the weight of the vinyl chloride monomer) of ascorbic acid was added as a reducing agent when the initial auxiliary raw materials were added in Example 1.

Example 7

A vinyl chloride polymer was prepared in the same manner as in Example 1 except that 1.0 ppm of copper sulfate was added based on the weight of the vinyl chloride monomer in Example 1.

Example 8

1) Seed Particle Preparation 73 kg of polymerization water, 1.21 kg of lauryl peroxide (LPO), and 0.9 g of paraquinone were added to a 200 l high-pressure reactor and the reactor was evacuated to a vacuum of −730 mmHg. 66 kg of a vinyl chloride monomer and 7.8 kg of sodium dodecylbenzene sulfonate were added to the reactor in a vacuum state and mixed by stirring for 15 minutes. An internal temperature of the reactor was decreased to 20° C. or less and homogenization was performed for 2 hours by using a rotor-stator type homogenizer. After the completion of the homogenization, the internal temperature of the reactor was set to 42° C. and polymerization was performed. When a pressure of the reactor leached 3.5 kgf/cm$^2$ after 558 minutes, the reaction was terminated and the unreacted vinyl chloride monomer was recovered and removed to obtain seed particles having an average particle diameter of 0.9 μm.

2) Vinyl Chloride Polymer Preparation

A vinyl chloride polymer was prepared in the same manner as in Example 1 except that 0.5 part by weight of seed particles (average particle diameter: 0.9 μm) was added when the initial auxiliary raw materials were added in Example 1.

Example 9

A vinyl chloride polymer was prepared in the same manner as in Example 1 except that 0.05 part by weight of an oil-soluble initiator (di-(2-ethylhexyl)peroxydicarbonate) was added instead of the water-soluble initiator (potassium persulfate), 1.0 part by weight of an auxiliary emulsifier (cetostearyl alcohol) was added when the initial auxiliary raw materials were added, and a homogenization process, in which a homogenizer was operated by distributing a total pressure of 1600 psi at a ratio of 50:50 at a front end and a rear end, respectively, after the addition of the vinyl chloride monomer under vacuum conditions, was performed in Example 1.

Comparative Example 1

A vinyl chloride polymer was prepared in the same manner as in Example 1 except that sodium hydroxide was added instead of the sodium carbonate in Example 1.

Comparative Example 2

A vinyl chloride polymer was prepared in the same manner as in Example 3 except that sodium hydroxide was added instead of the sodium carbonate in Example 3.

Comparative Example 3

A vinyl chloride polymer was prepared in the same manner as in Example 1 except that 5 ppm of copper sulfate was added based on the weight of the vinyl chloride monomer in Example 1.

Comparative Example 4

A vinyl chloride polymer was prepared in the same manner as in Example 3 except that 100 ppm of sodium carbonate and 100 ppm of sodium hydroxide were added instead of 200 ppm of the sodium carbonate in Example 3.

Comparative Example 5

A vinyl chloride polymer was prepared in the same manner as in Example 1 except that 200 ppm of ascorbic acid was added as a reducing agent based on the weight of the vinyl chloride monomer when the initial auxiliary raw materials were added in Example 1.

Comparative Example 6

A vinyl chloride polymer was prepared in the same manner as in Example 3 except that 200 ppm of ascorbic acid was added as a reducing agent based on the weight of the vinyl chloride monomer when the initial auxiliary raw materials were added in Example 3.

Comparative Example 7

A vinyl chloride polymer was prepared in the same manner as in Example 1 except that sodium carbonate was not added and 200 ppm of ascorbic acid was added as a reducing agent based on the weight of the vinyl chloride monomer when the initial auxiliary raw materials were added in Example 1.

Comparative Example 8

A vinyl chloride polymer was prepared in the same manner as in Example 1 except that sodium carbonate was not added, 200 ppm of ascorbic acid was added as a reducing agent based on the weight of the vinyl chloride monomer when the initial auxiliary raw materials were added, and 5 ppm of copper sulfate was added in Example 1.

Experimental Example 1

1) Reactivity Evaluation

A degree of improvement of reactivity relative to a polymerization reaction of a control group was evaluated based on the following indicators by checking reactivity during the preparation of the vinyl chloride polymers in the examples and the comparative examples, and the results thereof are presented in Table 1 below. In this case, with respect to the polymerization reaction of the control group, a polymerization reaction in pure emulsion polymerization without the addition of a transition metal catalyst and a pH regulator (redox polymerization system was not applied) under the same conditions as in Example 1 was applied.

◎: very good reactivity
○: good reactivity
Δ: level similar to the polymerization reaction of the control group or reaction delay
X: forced reaction termination due to runaway reaction or agglomeration Herein, the runaway reaction represents a reaction state in which the polymerization reaction is excessively promoted so that the reaction is not controlled, and, accordingly, an exothermic pattern is not uniform and an amount of heat generated is greatly increased so that an amount of heat removal relative to the amount of heat generated is insufficient to abnormally increase pressure and temperature during the polymerization.

2) Volatile Weight Loss

Volatile weight loss was measured according to DIN 75-201B using a fogging tester (Horizon-FTS, Thermo Fischer Scientific Inc.). After the fogging tester (Horizon-FTS, Thermo Fischer Scientific Inc.) was set to 100° C., a weight of an empty foil was measured and recorded. Thereafter, 10 g of each vinyl chloride polymer sample prepared in the examples and the comparative examples in an empty beaker was weighed and put in a cylinder and a sealing process of covering a top end of the cylinder with an aluminum foil was performed. Thereafter, the cylinder was heated at 100° C. for 16 hours, the foil was taken out to measure its weight after 4 hours, a value obtained by subtracting the measured weight of the sample after the heat treatment from the weight of the initial sample was then represented as the volatile weight loss, and the results thereof are presented in Table 1 below. The higher the volatile weight loss means the greater the amount of the volatile organic compound in the prepared polymer.

Experimental Example 2: Plastisol Physical Properties

1) Viscosity

After 100 g of each vinyl chloride polymer prepared in the examples and the comparative examples and 66.7 g of diisononyl phthalate (DINP) were mixed at 800 rpm for 10 minutes with an EUROSTAR IKA-WERKE mixer to prepare each plastisol, viscosity was measured using a rheometer (AR2000EX peltier plate, TA Instruments) with a 40 mm parallel plate fixture and a gap of 500 μm and the results thereof are presented in Table 1 below.

2) Foaming Properties (Foam Color)

100 g of each vinyl chloride polymer prepared in the examples and the comparative examples, 80 g of di(2-propylheptyl) phthalate (DPHP), 3 g of a Ba/Zn stabilizer, and 3 g of an acrylonitrile-based foaming agent were mixed at 800 rpm for 10 minutes with an EUROSTAR IKA-WERKE mixer to prepare each plastisol, the prepared plastisol was applied on release paper and coated with a 0.5 mm rod, a pregelling sheet was then prepared at 150° C. for 45 seconds using a Mathis oven, and gelation was performed at 200° C. for 90 seconds to prepare a foam sheet. White index of the prepared foam sheet was measured according to ASTM E 313-73 using a spectrophotometer (CM-700d) and presented in Table 1 below. The higher the measured white index was, the better the thermal stability was, and the good thermal stability means good foaming properties such as foam color quality.

TABLE 1

| Category | pH regulator Type | Addition amount (ppm) | Reducing agent amount (ppm) | $CuSO_4$ amount (ppm) | Reactivity | Volatile weight loss (mg) | Viscosity (Pa · s) | Foaming properties |
|---|---|---|---|---|---|---|---|---|
| Example 1 | $Na_2CO_3$ | 800 | — | 0.1 | ◎ | 0.1 | 130 | 42 |
| Example 2 | $Na_2CO_3$ | 800 | — | 0.02 | ○ | 0.1 | 110 | 45 |
| Example 3 | $Na_2CO_3$ | 200 | — | 0.1 | ◎ | 0.2 | 120 | 41 |
| Example 4 | $NaHCO_3$ | 800 | — | 0.1 | ◎ | 0.1 | 135 | 44 |
| Example 5 | $K_2CO_3$ | 800 | — | 0.1 | ◎ | 0.2 | 140 | 45 |
| Example 6 | $Na_2CO_3$ | 800 | 100 | 0.1 | ◎ | 0.3 | 140 | 41 |
| Example 7 | $Na_2CO_3$ | 800 | — | 1.0 | ◎ | 0.2 | 150 | 40 |
| Example 8 | $Na_2CO_3$ | 800 | — | 0.1 | ◎ | 0.2 | 110 | 45 |
| Example 9 | $Na_2CO_3$ | 800 | — | 0.1 | ◎ | 0.2 | 110 | 44 |
| Comparative Example 1 | NaOH | 800 | — | 0.1 | X (agglomeration) | — | — | — |
| Comparative Example 2 | NaOH | 200 | — | 0.1 | Δ | 0.7 | 110 | 42 |
| Comparative Example 3 | $Na_2CO_3$ | 800 | — | 5 | X (runaway reaction) | 0.3 | 200 or more | 30 |
| Comparative Example 4 | NaOH + $Na_2CO_3$ | 200 (1:1) | — | 0.1 | Δ | 0.6 | 90 | 40 |
| Comparative Example 5 | $Na_2CO_3$ | 800 | 200 | 0.1 | X (runaway reaction) | 0.4 | 170 | 36 |
| Comparative Example 6 | $Na_2CO_3$ | 200 | 200 | 0.1 | ◎ | 0.5 | 150 | 38 |

TABLE 1-continued

| Category | pH regulator Type | Addition amount (ppm) | Reducing agent amount (ppm) | CuSO$_4$ amount (ppm) | Reactivity | Volatile weight loss (mg) | Viscosity (Pa·s) | Foaming properties |
|---|---|---|---|---|---|---|---|---|
| Comparative Example 7 | — | — | 200 | 0.1 | Δ | 1.2 | 110 | 37 |
| Comparative Example 8 | — | — | 200 | 5 | ⊚ | 1.4 | 170 | 29 |

As illustrated in Table 1, with respect to Examples 1 to 9 in which the carbonate-based metal salt was used as the pH regulator according to the embodiment of the present disclosure and the redox polymerization system was applied, and the amounts of the transition metal catalyst and the reducing agent were controlled, it may be confirmed that, since reactivities were improved while viscosity and foaming properties of the plastisols were significantly improved in comparison to those of Comparative Examples 1 to 8 which were outside the ranges of the present disclosure, productivities were improved, and it may be confirmed that volatile weight losses of the polymers were also significantly low.

Specifically, with respect to Comparative Example 1 which was different in that the carbonate-based metal salt was not included as the pH regulator under the same conditions as in Examples 1, 4, and 5, since the agglomeration of the latex occurred during the polymerization, a normal polymer latex may not be obtained, and, with respect to Comparative Example 2 in which the amount of the pH regulator was reduced in comparison to that of Comparative Example 1 to prevent the agglomeration of the latex, since the reaction was delayed even under the same conditions as in Example 3, it may be confirmed that there was no reaction improvement effect.

Also, with respect to Comparative Example 3 in which the carbonate-based metal salt was used as the pH regulator, but the transition metal catalyst was excessively added in an amount of greater than 3.0 ppm, since the runway reaction occurred, it may be confirmed that there was no choice but to forcibly terminate the reaction and both the viscosity and foaming properties of the prepared polymer plastisol were also deteriorated in comparison to those of Examples 1 to 9. With respect to Comparative Example 4 in which the carbonate-based metal salt was used as the pH regulator, but sodium hydroxide, instead of the carbonate-based metal salt, was used together, it may be confirmed that there was no reaction improvement effect and, also, there was almost no effect of decrease in volatile weight loss, different from Comparative Example 3 in which the carbonate-based metal salt was only used under the same conditions.

Furthermore, with respect to Comparative Examples 5 to 8 in which the excessive amount of the reducing agent was added, it may be confirmed that viscosity and foaming properties of the plastisols were deteriorated or there was no effect of improving reactivity, and, particularly, with respect to Comparative Examples 7 and 8 in which the carbonate-based metal salt was not included, since volatile weight losses were high, it may be confirmed that an amount of volatile organic compound in each polymer was high.

Thus, since the amounts of the transition metal catalyst and the reducing agent were controlled while using the pH regulator composed of the carbonate-based metal salt, it may be confirmed that the reactivity may be simultaneously improved while improving the viscosity and foaming properties of the plastisol.

The invention claimed is:

1. A composition for preparing a vinyl chloride-based polymer, the composition comprising:
    a vinyl chloride-based monomer,
    a transition metal catalyst,
    a pH regulator composed of a carbonate-based metal salt, and
    0 ppm to 150 ppm of a reducing agent based on a weight of the vinyl chloride-based monomer,
    wherein the transition metal catalyst is included in an amount of 0.01 ppm to 3.0 ppm based on the weight of the vinyl chloride-based monomer.

2. The composition of claim 1, wherein the carbonate-based metal salt comprises at least one selected from the group consisting of sodium carbonate ($Na_2CO_3$), sodium hydrogen carbonate ($NaHCO_3$), magnesium carbonate ($MgCO_3$), calcium carbonate ($CaCO_3$), and potassium carbonate ($K_2CO_3$).

3. The composition of claim 1, wherein the composition does not comprise the reducing agent.

4. The composition of claim 1, wherein the composition does not comprise an oxidizing agent.

5. The composition of claim 1, wherein the transition metal catalyst is included in an amount of 0.01 ppm to 1.2 ppm based on the weight of the vinyl chloride-based monomer.

6. The composition of claim 1, wherein the pH regulator is included in an amount of 50 ppm to 1,200 ppm based on the weight of the vinyl chloride-based monomer.

7. The composition of claim 1, wherein the transition metal catalyst comprises at least one selected from copper sulfate ($CuSO_4$) and iron sulfate ($FeSO_4$).

8. A method of preparing a vinyl chloride-based polymer, the method comprising steps of:
    adding 0.01 ppm to 3.0 ppm of a transition metal catalyst based on a weight of a vinyl chloride-based monomer, a pH regulator composed of a carbonate-based metal salt, and 0 ppm to 150 ppm of a reducing agent based on the weight of the vinyl chloride-based monomer to a polymerization reactor (step 1), and
    performing polymerization by adding the vinyl chloride-based monomer to the polymerization reactor (step 2).

9. The method of claim 8, further comprising performing a vacuum treatment of the polymerization reactor before step 2.

10. The method of claim 8, wherein one or more emulsifiers and a polymerization initiator are included in the polymerization reactor.

11. The method of claim 8, wherein the polymerization is performed by any one method selected from the group consisting of pure emulsion polymerization, seed emulsion polymerization, and microsuspension polymerization.

* * * * *